(12) United States Patent
Harwath-Seyfried

(10) Patent No.: US 7,186,170 B2
(45) Date of Patent: Mar. 6, 2007

(54) DEVICE AND METHOD FOR SEVERING WELDS

(75) Inventor: Wolfgang Harwath-Seyfried, Villingen-Schwenningen (DE)

(73) Assignee: MV Marketing und Vertriebs-GmbH & Co., Villingen-Schwenningen (DE)

( * ) Notice: Subject to any disclaimer, the term of this patent is extended or adjusted under 35 U.S.C. 154(b) by 28 days.

(21) Appl. No.: 11/142,588

(22) Filed: Jun. 1, 2005

(65) Prior Publication Data
US 2005/0272350 A1    Dec. 8, 2005

(30) Foreign Application Priority Data
Jun. 2, 2004    (DE)    ............ 10 2004 027 032

(51) Int. Cl.
*B24B 23/02*    (2006.01)

(52) U.S. Cl. ............ 451/177; 451/352; 451/358; 451/547

(58) Field of Classification Search ............ 451/177, 451/352, 358, 547
See application file for complete search history.

(56) References Cited

U.S. PATENT DOCUMENTS

| | | | | | |
|---|---|---|---|---|---|
| 5,373,834 A | * | 12/1994 | Chiuminatta et al. | ......... | 125/15 |
| 5,997,597 A | * | 12/1999 | Hagan | ............ | 51/309 |
| D423,898 S | * | 5/2000 | Kelley | ............ | D8/64 |
| 6,110,027 A | * | 8/2000 | Muller | ............ | 451/359 |
| 6,186,879 B1 | * | 2/2001 | Ericsson | ............ | 451/358 |
| 6,478,021 B1 | * | 11/2002 | Kim et al. | ............ | 125/15 |
| 6,561,063 B1 | * | 5/2003 | Mulford et al. | ............ | 82/128 |
| 6,561,887 B2 | * | 5/2003 | Lai et al. | ............ | 451/358 |
| 6,688,955 B2 | * | 2/2004 | Ruey-Zon | ............ | 451/360 |
| 6,699,114 B1 | * | 3/2004 | Booeshaghi et al. | ......... | 451/451 |
| 6,845,767 B2 | * | 1/2005 | Sakarcan | ............ | 125/15 |

FOREIGN PATENT DOCUMENTS

| | | |
|---|---|---|
| DE | 1886766 U | 1/1964 |
| DE | 6906518 U | 12/1969 |
| DE | 29824023 U | 3/2000 |

* cited by examiner

*Primary Examiner*—Lee D. Wilson
*Assistant Examiner*—Anthony Ojini
(74) *Attorney, Agent, or Firm*—Ohlandt, Greeley, Ruggiero & Perle, L.L.P.

(57) ABSTRACT

A milling cutter or grinding tool for severing welds on body sheets is provided. The tool includes an essentially circular-cylindrical cutting wheel having cutting edges at least on the circumference and a pair of distance plates with a smaller radius than the outside diameter of the cutting wheel. The distance plates are arranged in an axially symmetrical manner on at least one side of the cutting wheel.

31 Claims, 5 Drawing Sheets

DEVICE AND METHOD FOR SEVERING WELDS

CROSS-REFERENCE TO RELATED APPLICATIONS

This application claims benefit under 35 U.S.C. § 119(a) of German Patent Application No. 10-2004-027032.5-14, filed Jun. 2, 2004, the entire contents of which are incorporated herein by reference.

BACKGROUND OF THE INVENTION

1. Field of the Invention

The invention relates to a device and a method for severing welds, in particular on vehicle bodies.

2. Description of Related Art

Vehicles bodies produced from sheet metal have generally been joined together in the past by spot-welding connections. If individual sheets have to be replaced during repair work, such spot connections can be undone using drilling and milling tools.

In the case of modern vehicle bodies, welds are used evermore frequently in order to achieve greater body stiffnesses. Particularly in the case of modern steel and aluminum bodies, use is made, in addition to bonding connections of laser welding methods. These laser connections have very great strength and, in addition, may be automated at a justifiable cost.

However, the severing of welds is problematic. If, in the event of repair, individual sheets have to be replaced, welds are generally severed with an angle grinder. It has been shown in practice that the exact guidance of a tool of this type is difficult. In particular, it is not possible, in the case of known angle grinders, to adequately regulate the cutting depth. This has the consequence that not only the sheet which is to be replaced, but generally also the sheet situated underneath it is damaged.

BRIEF SUMMARY OF THE INVENTION

The invention is based on the object of providing a tool and a method with which welds, in particular laser welds, can easily be severed. Furthermore, it is the object of the invention that the sheet situated below is not destroyed when severing the weld. In addition, the tool according to the invention is to be easy to handle and cost-effective to produce.

The object of the invention is achieved by a tool and a method for severing welds.

According to the invention, a material-removing tool, in particular a milling cutter, is provided for severing welds. In particular, the invention relates to a use for severing laser welds on body sheets. The milling cutter comprises a cutting wheel which is advantageously essentially circular-cylindrical and, according to one embodiment, has cutting edges at least on the circumference. A distance plate which has a smaller radius than the material-removing part, in particular than the outside diameter of the cutting wheel, is arranged preferably in an axially symmetrical manner on at least one side of the cutting wheel.

The weld is therefore severed in particular by a peripheral milling cutter. It has turned out that in particular laser welds can be severed substantially more neatly by means of a peripheral milling cutter of this type than by means of a grinding wheel. A distance plate arranged in an axially symmetrical manner prevents the tool from penetrating the body deeper than intended. It is thus possible to mill away the weld essentially only as far as the thickness of the upper sheet. As a result, the lower sheet is retained and need neither to be refinished nor replaced.

According to one advantageous embodiment of the invention, at least one distance plate is arranged on both sides of the cutting wheel. It is thus ensured that the tool does not remove more material on one side by tilting during milling. The tool is even substantially prevented from tilting.

In one development of the invention, the cutting wheel or distance plates are exchangeable. It is thus possible to set the tool to different cutting depths. For example, by exchanging the distance plates, different depths can be set with one and the same cutting wheel. The same can also be achieved by exchanging the cutting wheel, but in particular an exchange of the cutting wheel in the case of wear is envisaged.

In one exemplary embodiment of the invention, the milling cutter has an arbor for clamping into a tool-holding fixture. The tool can thus be mounted, for example, on a drilling machine.

The cutting wheel and the distance plates are advantageously fastened to the arbor for clamping into a tool-holding fixture.

In one embodiment of the invention, a distance plate is connected fixedly to the arbor for clamping into a tool-holding fixture, in particular is of integral design therewith. For example, the rear distance plate thus forms a unit with the arbor. The front distance plate can then be screwed on, for example, with a thread and thus secure the cutting wheel at the same time. Both distance plates thus rotate together with the cutting wheel. It has turned out that the resultant rubbing of the distance plates on the sheet does not result in substantial damage.

As an alternative, it would be conceivable for the distance plates to be arranged in a freely rotatable manner on the arbor. However, a drawback exists that precautions have to be taken against wear due to friction between the cutting wheel and distance plates.

For milling open welds on body sheets a rake angle of between 3 and 15°, preferably between 5 and 10° and particularly preferably between 6 and 8° has proven advantageous for the cutting edges of the cutting wheel. The cutting edges thus have high chip removal and do not tend to break off.

In order to reduce the friction, it is advantageous to design the cutting edges of the cutting wheel such that they are undercut.

In this case, a clearance angle of between 1 and 30°, preferably between 8 and 15 and particularly preferably between 10 and 12° has turned out to be particularly suitable.

In one preferred embodiment of the invention, the cutting wheel has an outside diameter of between 10 and 120 mm, preferably between 15 and 70 mm and particularly preferably between 20 and 50 mm. As number of teeth for the cutting wheel, 25 to 60 teeth, preferably 40 to 55 teeth, have turned out to be suitable. With these diameters and numbers of teeth, an optimum result is achieved in the case of body sheets.

For a body sheet, the cutting wheel has a width of 1 to 10 mm, preferably of 3 to 6 mm. Customary laser welds can thus be severed.

A cutting wheel of solid hard metal has turned out to be particularly suitable for milling body sheets.

In one preferred embodiment of the milling cutter, the distance plates have a radius which is smaller than the cutting wheel by 0.1 to 3 mm, preferably 0.8 to 1.2 mm and particularly preferably 1.2 to 1.7 mm. Typical sheet thicknesses in the automobile sector are thus covered.

The invention furthermore relates to a milling tool with a milling cutter according to the invention, a holding handle and an actuating unit, the milling cutter being fastenable by an arbor in a holding fixture.

In one development of the invention, the milling tool has, essentially parallel to the milling cutter axis, a protector for protecting against chips flying around. It is thus ensured that people in the vicinity are not injured by chips flying around.

The protector advantageously extends essentially in the form of an arc of a circle around the milling cutter axis and is formed from transparent material, for example from Plexiglas.

The milling operation can thus be monitored visually.

In one particular embodiment of the milling tool, the axis of rotation of the holding fixture is arranged approximately at right angles to the holding handle. It is nevertheless possible to arrange the axis of rotation of the holding fixture obliquely with respect to the holding handle. It has turned out that with this form of tool in particular welds on the edge of the body are readily accessible, since the head and handle of the tool, in which the drive is usually located, are located outside the contour of the body during milling.

According to the invention, as an alternative to the milling cutter use may be made of a grinding tool. According thereto, the grinding tool is provided for abrasive cutting, in particular is set up for severing welds, in particular laser welds on the body sheets, the grinding tool comprising a grinding wheel and in which a distance plate which has a smaller radius than the outside diameter of the grinding wheel is arranged in an axially symmetrical manner on at least one side of the grinding wheel.

As an alternative to the milling cutter, a grinding wheel is therefore provided instead of the cutting wheel. A grinding wheel of this type is obtainable as a finished part and is therefore substantially cheaper than the cutting wheel according to the invention. However, a drawback is that generally substantially higher peripheral speeds are required in order to reach a sufficient cutting power. In addition, wear to the grinding wheel results in a reduction in the diameter of the same, as a result of which the cutting depth changes. These disadvantages can be reduced by means of suitable materials, such as, for example, a composite material with diamond particles.

The invention furthermore relates to a method for severing welds, in particular laser welds on body sheets. According to the invention, a peripheral milling cutter or a grinding wheel is used to mill away the weld up to a depth which corresponds approximately to the upper sheet. It is thus ensured that only the upper sheet is damaged by the milling operation. The lower sheet, which is typically part of the load-bearing body structure, is therefore not damaged and, in the event of a repair, needs neither to be touched up nor replaced.

In an advantageous manner, the weld is severed with a milling cutter according to the invention. In this case, at least one distance plate is arranged in an axially symmetrical manner to the milling cutter or to the grinding wheel, the distance plate having a radius which is smaller approximately by the thickness of the upper sheet to be severed than the material-removing part of the tool.

It is thus ensured that the weld is severed only as far as the thickness of the upper sheet.

The invention will be explained in more detail below with reference to an exemplary embodiment.

DETAILED DESCRIPTION OF THE INVENTION

Figure 1:
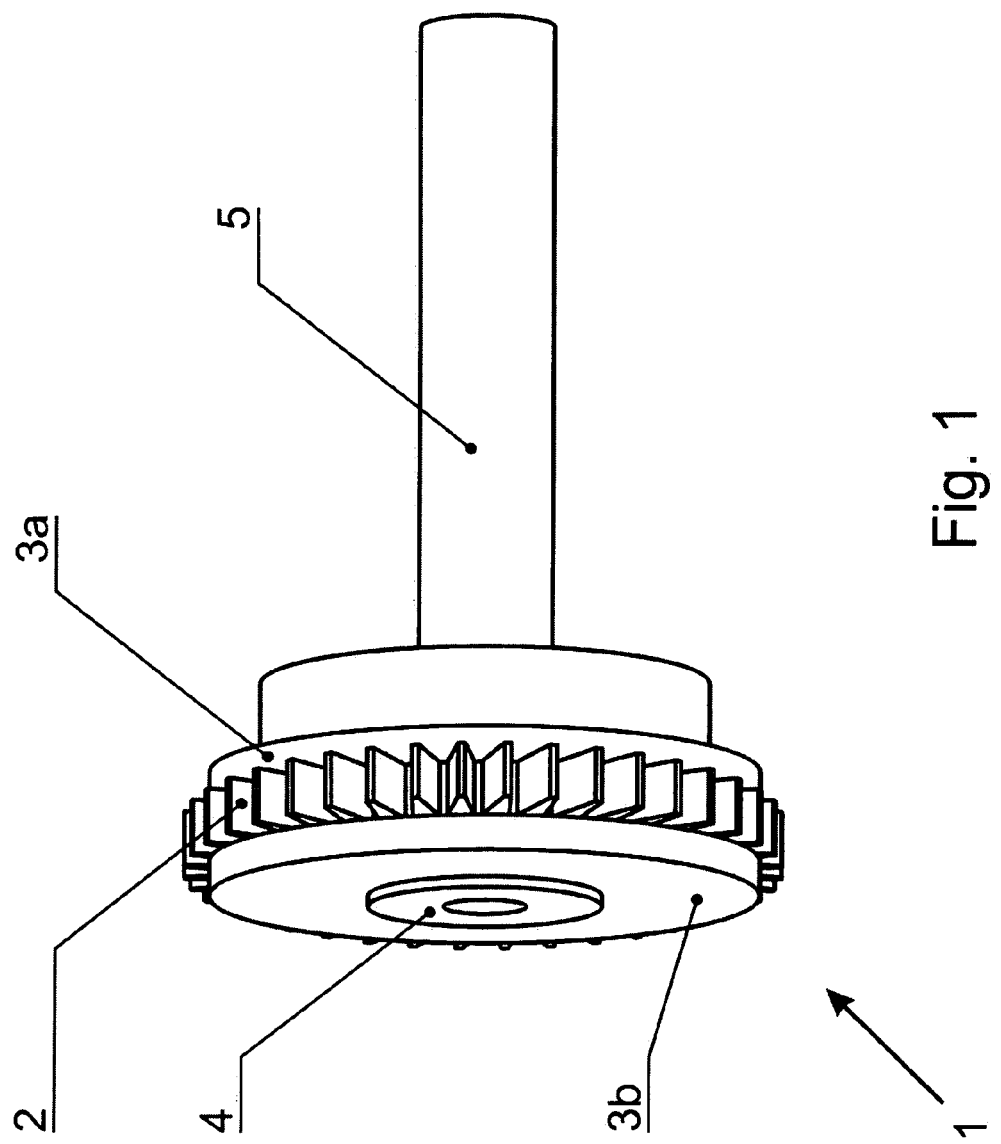
FIG. 1 shows a diagrammatic, perspective view of the milling cutter according to the invention.

FIG. 1 shows a milling cutter 1 according to the invention.

The milling cutter 1 is designed for severing laser welds on body sheets. The cutting wheel 2 has an outside diameter of 45 mm and has 52 teeth. The width of the cutting wheel 2 is 4 mm. Distance plates 3a, 3b are arranged on both sides next to the cutting wheel 2. For clamping into a tool-holding fixture (cannot be seen), the milling cutter 1 has a circular-cylindrical arbor 5. The arbor 5 and the rear distance plate 3a are formed integrally. The cutting wheel 2 and the front distance plate 3b are fastened with a screw 4 to the part composed of the rear distance plate 3a and arbor 5.

Figure 2:
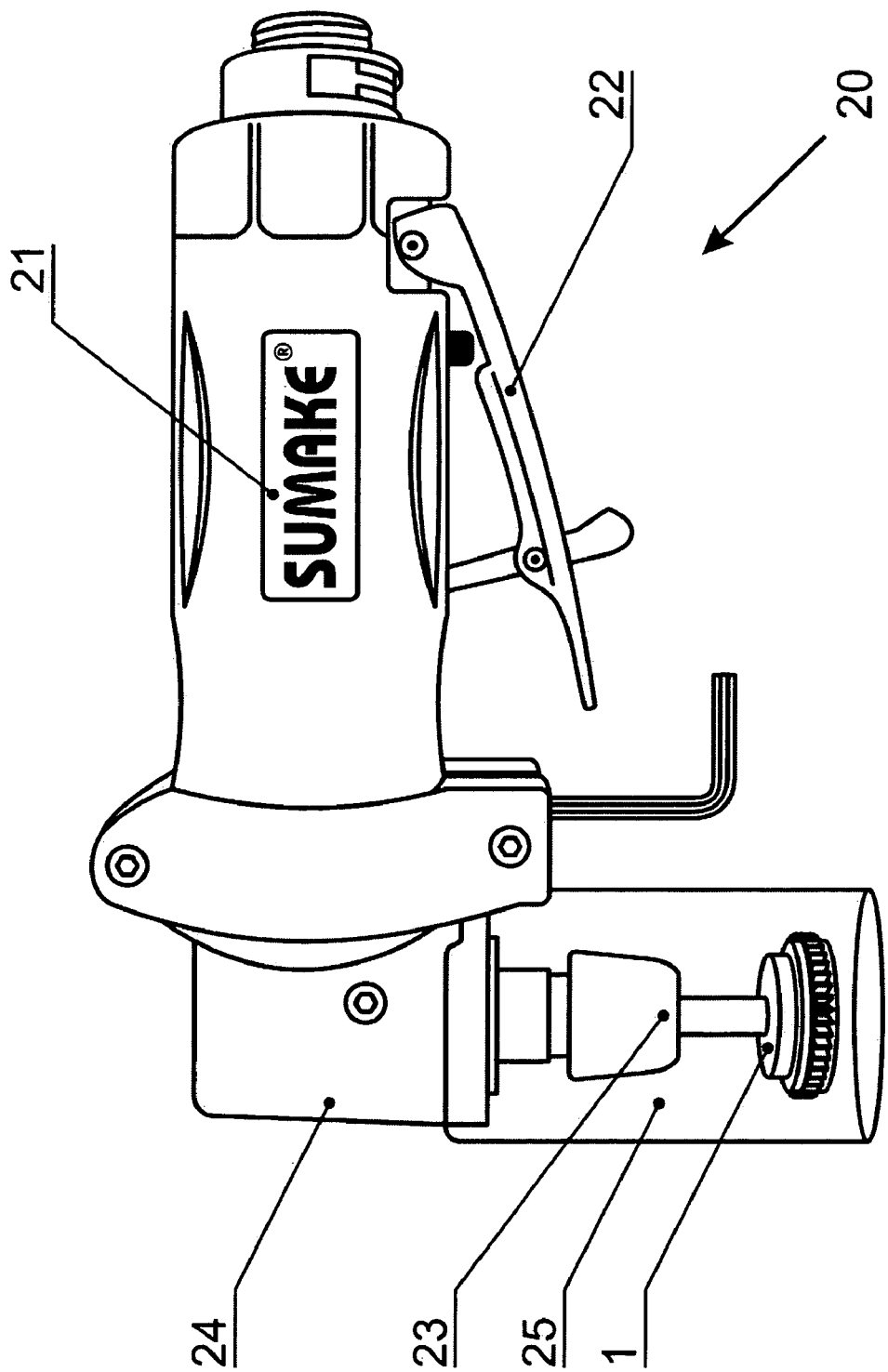
FIG. 2 shows an illustration by way of example of a milling tool according to the invention.

FIG. 2 shows an exemplary embodiment for a milling tool 20 according to the invention. The milling tool 20 has a holding fixture 23 for clamping the milling cutter 1. A Plexiglass protector 25 is fitted parallel to the axis of rotation. The tool has a handle 21 with an actuating unit 22. Located above the handle is the head 24 to which the holding fixture 23 for clamping the milling cutter 1 is arranged at a right angle.

Figure 3:
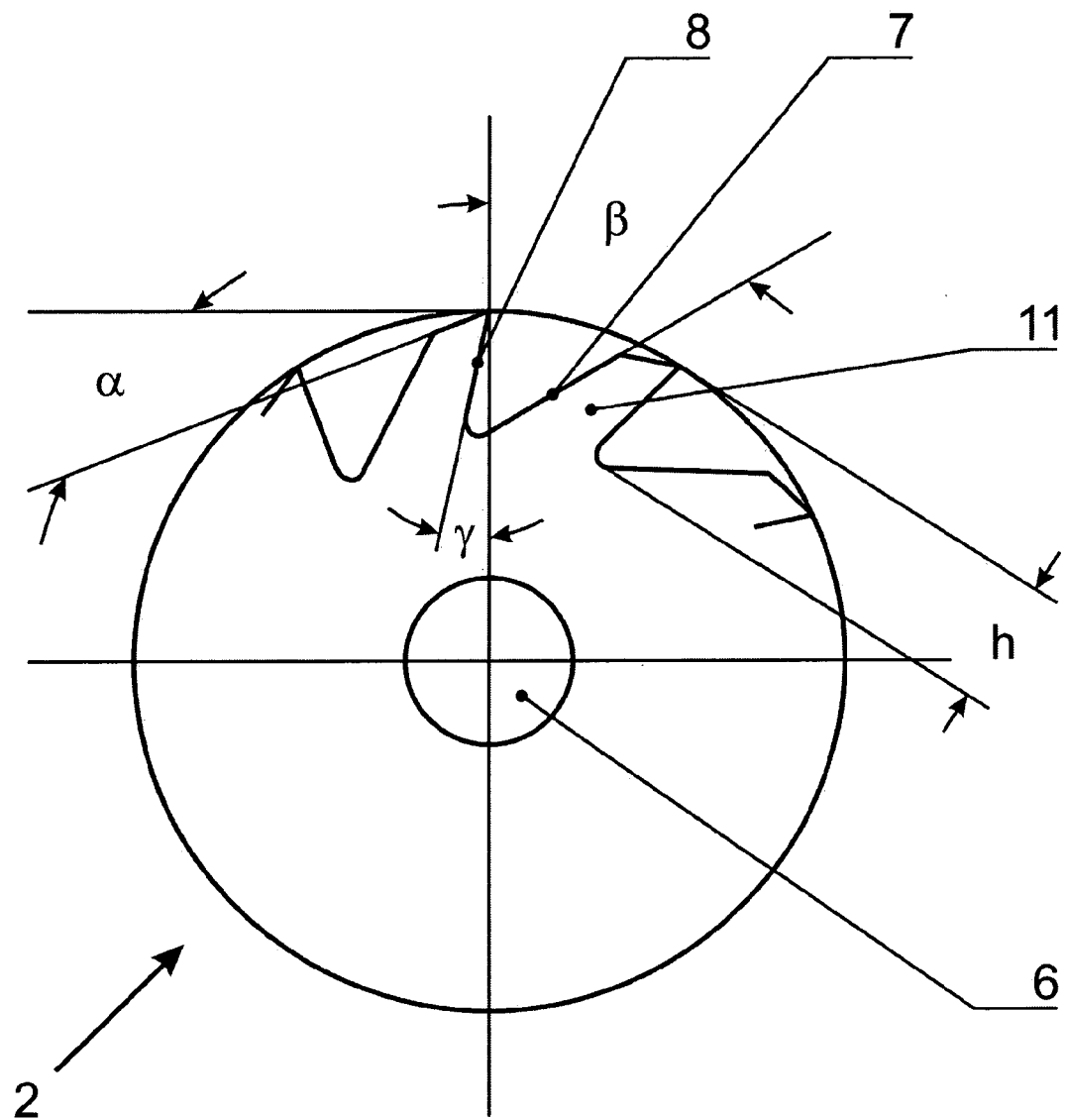
FIG. 3 shows a diagrammatic sketch of a cutting wheel.

FIG. 3 shows a sketch of a cutting wheel 2 according to the invention. The cutting wheel 2 is composed of solid hard metal and has an outside diameter of 25 mm. For centering and clamping on an arbor (cannot be seen), a hole 6 with a diameter of 8 mm is provided. The 40 teeth 11 of the cutting wheel 2 have a rake angle $\gamma$ of 8°. The cutting edges are undercut with a clearance angle $\alpha$ of 12°. The cutting wheel 2 has a width of 4 mm. The front flanks 8 of the teeth have a height h of 9 mm. The rear flank 7 and front flank 8 of the following tooth are at an angle of 55° with respect to each other.

Figure 4:
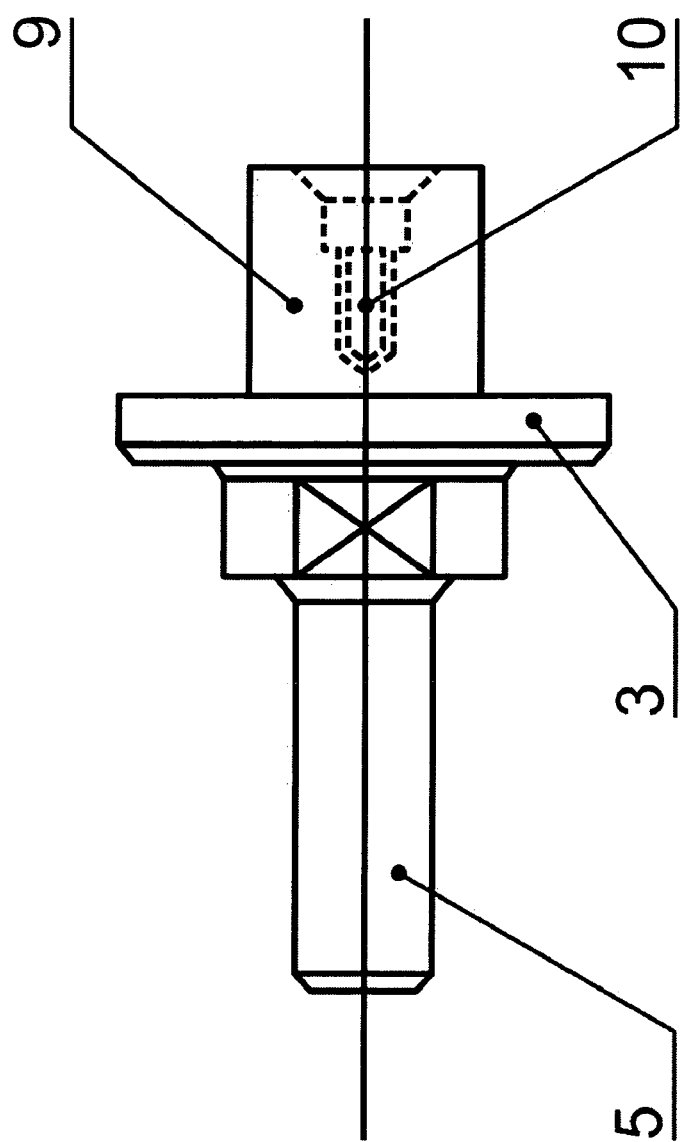
FIG. 4 shows a diagrammatic sketch of a cutting wheel holding fixture.

FIG. 4 shows a sketch of a holding fixture of a milling cutter according to the invention. The single-piece holding fixture comprises an arbor 5 for clamping into a tool-holding fixture (cannot be seen), a distance plate 3 with a diameter of 23.4 mm and a further arbor 10 for the placing-on of a cutting wheel, and a further distance plate (cannot be seen) which can then be fixed with a screw (cannot be seen) for which a thread 10 is provided.

Figure 5:
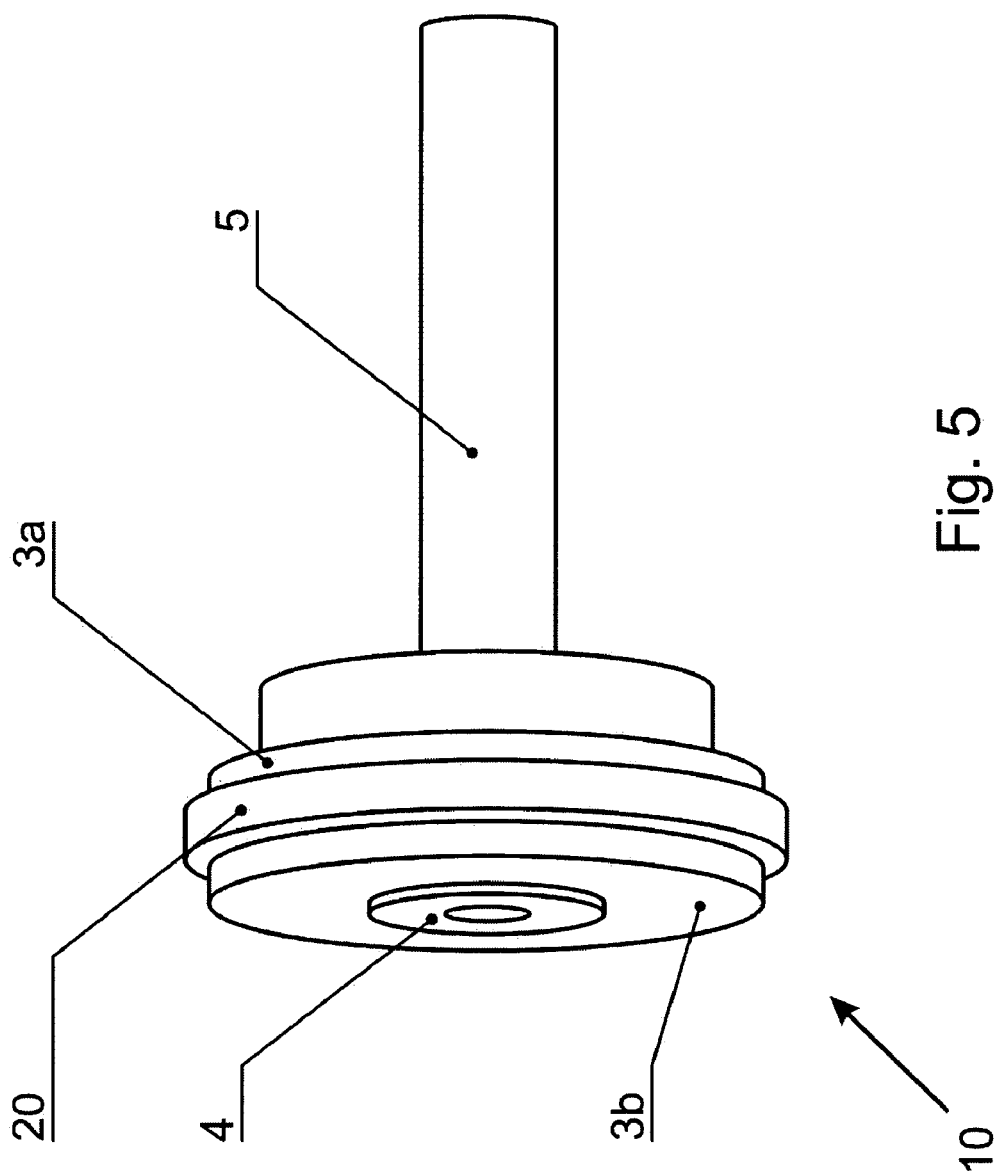
FIG. 5 shows a diagrammatic, perspective view of the grinding tool according to the invention.

FIG. 5 shows a grinding tool 10 according to the invention. The grinding tool 10 is also designed for severing laser welds on body sheets. The width of the grinding wheel 20 is 4 mm. Distance plates 3a, 3b are arranged on both sides next to the grinding wheel 20. For clamping into a tool-holding fixture (cannot be seen), the grinding tool 10 has a circular-cylindrical arbor 5. The arbor 5 and the rear distance plate 3a are formed integrally. The grinding wheel 20 and the front distance plate 3b are fastened with a screw 4 to the part composed of the rear distance plate 3a and arbor 5.

The invention claimed is:

1. A material-removing tool for severing welds, comprising:
   a cutting wheel having a material-removing part; and
   at least one distance plate having a radius, the radius being smaller than the material-removing part but preventing the material-removing part from penetrating the welds beyond a predetermined depth, wherein the at least one distance plate is arranged on at least one side of the cutting wheel.

2. The material-removing tool as claimed in claim 1, wherein the cutting wheel is of essentially circular-cylindrical design.

3. The material-removing tool as claimed in claim 1, wherein the material-removing part has cutting edges on the circumference.

4. The material-removing tool as claimed in claim 1, wherein the at least one distance plate is arranged in an axially symmetrical manner to the cutting wheel.

5. The material-removing tool as claimed in claim 1, wherein the at least one distance plate comprises two distance plates, wherein the two distance plates are arranged on opposite sides of the grinding wheel.

6. The material-removing tool as claimed in claim 1, wherein the cutting wheel and/or the at least one distance plate are exchangeable.

7. The material-removing tool as claimed in claim 1, further comprising an arbor for clamping into a tool-holding fixture.

8. The material-removing tool as claimed in claim 7, wherein the cutting wheel and the at least one distance plate can be fastened to the arbor.

9. The material-removing tool as claimed in claim 7, wherein the at least one distance plate is connected fixedly to the arbor.

10. The material-removing tool as claimed in claim 1, wherein the cutting wheel has an outside diameter of between 10 and 120 mm.

11. The material-removing tool as claimed in claim 1, wherein the cutting wheel has 25 to 60 teeth.

12. The material-removing tool as claimed in claim 1, wherein the cutting wheel has a width of 1 to 10 mm.

13. The material-removing tool as claimed in claim 1, wherein the cutting wheel is formed from metal.

14. The material-removing tool as claimed in claim 1, wherein the at least one distance plate has a radius that is smaller than the cutting wheel by 0.1 to 3 mm.

15. A material-removing tool for severing welds, comprising:
    a cutting wheel having a material-removing part; and
    at least one distance plate having a smaller radius than the material-removing part, wherein the at least one distance plate is arranged on at least one side of the cutting wheel, wherein the material-removing part comprises cutting edges having a rake angle of between 3 and 15°.

16. The material-removing tool as claimed in claim 15, wherein the cutting edges are undercut.

17. The material-removing tool as claimed in claim 16, wherein the cutting edges are undercut with a clearance angle of between 1 and 30°.

18. The material-removing tool as claimed in claim 16, wherein the cutting edges are undercut with a clearance angle of between 8 and 15°.

19. The material-removing tool as claimed in claim 16, wherein the cutting edges are undercut with a clearance angle of between 10 and 12°.

20. A milling tool comprising:
    a milling cutter having a material-removing part and at least one distance plate with a radius, the radius being smaller than the material-removing part but preventing the material-removing part from penetrating beyond a predetermined depth, the at least one distance plate being arranged on at least one side of the material-removing part;
    a holding handle; and
    an actuating unit,
    whereas the milling cutter is fastenable by an arbor in a holding fixture.

21. The milling tool as claimed in claim 20, further comprising a protector for protecting against chips flying around, the protector being essentially parallel to a milling cutter axis.

22. The milling tool as claimed in claim 21, wherein the protector extends essentially in the form of an arc of a circle around the milling cutter axis.

23. The milling tool as claimed in claim 22, wherein the protector is formed essentially from transparent material.

24. The milling tool as claimed in claim 20, wherein the holding fixture has an axis of rotation that is arranged approximately at right angles to the holding handle.

25. A grinding tool for severing welds, comprising:
    a grinding wheel; and
    at least one distance plate having a radius, the radius being smaller than the outside diameter of the grinding wheel but preventing the grinding wheel from penetrating the welds beyond a predetermined depth, the at least one distance plate being arranged on at least one side of the grinding wheel.

26. The grinding tool as claimed in claim 25, wherein the at least one distance plate comprises two distance plates, wherein the two distance plates are arranged on opposite sides of the grinding wheel.

27. The grinding tool as claimed in claim 25, wherein the grinding wheel and/or the at least one distance plate are exchangeable.

28. The grinding tool as claimed in claim 25, further comprising an arbor for clamping into a tool-holding fixture.

29. The grinding tool as claimed in claim 25, wherein the at least one distance plate has a radius that is smaller than the cutting wheel by 0.1 to 3 mm.

30. A material-removing tool for severing welds, comprising:
    a cutting wheel having a material-removing part; and at least one distance plate having a smaller radius than the material-removing part, wherein the at least one distance plate is arranged on at least one side of the cutting wheel, and wherein the material-removing part comprises cutting edges having a rake angle of between 5 and 10°.

31. A material-removing tool for severing welds, comprising:
    a cutting wheel having a material-removing part; and
    at least one distance plate having a smaller radius than the material-removing part, wherein the at least one distance plate is arranged on at least one side of the cutting wheel, and wherein the material-removing part comprises cutting edges having a rake angle of between 6 and 8°.

* * * * *